United States Patent
Morrison et al.

(10) Patent No.: US 8,456,451 B2
(45) Date of Patent: *Jun. 4, 2013

(54) SYSTEM AND METHOD FOR DIFFERENTIATING BETWEEN POINTERS USED TO CONTACT TOUCH SURFACE

(75) Inventors: Gerald D. Morrison, Calgary (CA); David E. Holmgren, Calgary (CA)

(73) Assignee: SMART Technologies ULC (CA)

( * ) Notice: Subject to any disclaimer, the term of this patent is extended or adjusted under 35 U.S.C. 154(b) by 1091 days.

This patent is subject to a terminal disclaimer.

(21) Appl. No.: 12/325,507

(22) Filed: Dec. 1, 2008

(65) Prior Publication Data

US 2009/0160801 A1    Jun. 25, 2009

Related U.S. Application Data

(63) Continuation of application No. 10/384,783, filed on Mar. 11, 2003, now Pat. No. 7,532,206.

(51) Int. Cl.
G09G 5/00    (2006.01)

(52) U.S. Cl.
USPC ...... 345/179; 345/175; 178/18.09; 178/19.01

(58) Field of Classification Search
USPC ......... 345/156, 157, 158, 173, 175, 179–183; 178/18.01, 18.03, 18.09, 18.11, 19.01
See application file for complete search history.

(56) References Cited

U.S. PATENT DOCUMENTS

| | | | |
|---|---|---|---|
| 2,769,374 A | 11/1956 | Sick | |
| 3,025,406 A | 3/1962 | Stewart et al. | |
| 3,128,340 A | 4/1964 | Harmon | |
| 3,187,185 A | 6/1965 | Milnes | |
| 3,360,654 A | 12/1967 | Muller | |
| 3,478,220 A | 11/1969 | Milroy | |
| 3,613,066 A | 10/1971 | Cooreman | |

(Continued)

FOREIGN PATENT DOCUMENTS

AU    2003233728 A1    12/2003
AU    2006243730 A1    11/2006

(Continued)

OTHER PUBLICATIONS

Jul. 5, 2010 Office Action, with English translation, for Japanese Patent Application No. 2005-000268 (6 pages).

(Continued)

*Primary Examiner* — Tom Sheng
(74) *Attorney, Agent, or Firm* — Katten Muchin Rosenman LLP (57) ABSTRACT

A touch system comprises a touch surface and at least one camera acquiring images of the touch surface. A pointer contact data generator generates pointer position data in response to pointer contact with the touch surface, the pointer position data representing where on the touch surface pointer contact is made. A processor communicates with the at least one camera and the pointer contact data generator. The processor analyzes acquired images to determine the type of pointer used to contact the touch surface, and processes the pointer position data in accordance with the determined type of pointer. In the preferred embodiment the processor distinguishes between pointer tip touch surface contacts, pointer backend touch surface contacts and finger touch surface contacts. A writing function is invoked in response to pointer tip touch surface contacts. An erase function is invoked in response to pointer backend touch surface contacts. Mouse events are generated in response to finger touch surface contacts.

21 Claims, 5 Drawing Sheets

U.S. PATENT DOCUMENTS

| | | |
|---|---|---|
| 3,764,813 A | 10/1973 | Clement et al. |
| 3,775,560 A | 11/1973 | Ebeling et al. |
| 3,857,022 A | 12/1974 | Rebane et al. |
| 3,860,754 A | 1/1975 | Johnson et al. |
| 4,107,522 A | 8/1978 | Walter |
| 4,144,449 A | 3/1979 | Funk et al. |
| 4,243,879 A | 1/1981 | Carroll et al. |
| 4,247,767 A | 1/1981 | O'Brien et al. |
| 4,420,261 A | 12/1983 | Barlow et al. |
| 4,459,476 A | 7/1984 | Weissmueller et al. |
| 4,468,694 A | 8/1984 | Edgar |
| 4,507,557 A | 3/1985 | Tsikos |
| 4,550,250 A | 10/1985 | Mueller et al. |
| 4,553,842 A | 11/1985 | Griffin |
| 4,558,313 A | 12/1985 | Garwin et al. |
| 4,639,720 A | 1/1987 | Rympalski et al. |
| 4,672,364 A | 6/1987 | Lucas |
| 4,673,918 A | 6/1987 | Adler et al. |
| 4,703,316 A | 10/1987 | Sherbeck |
| 4,710,760 A | 12/1987 | Kasday |
| 4,737,631 A | 4/1988 | Sasaki et al. |
| 4,742,221 A | 5/1988 | Sasaki et al. |
| 4,746,770 A | 5/1988 | McAvinney |
| 4,762,990 A | 8/1988 | Caswell et al. |
| 4,766,424 A | 8/1988 | Adler et al. |
| 4,782,328 A | 11/1988 | Denlinger |
| 4,811,004 A | 3/1989 | Person et al. |
| 4,818,826 A | 4/1989 | Kimura |
| 4,820,050 A | 4/1989 | Griffin |
| 4,822,145 A | 4/1989 | Staelin |
| 4,831,455 A | 5/1989 | Ishikawa |
| 4,851,664 A | 7/1989 | Rieger |
| 4,868,551 A | 9/1989 | Arditty et al. |
| 4,868,912 A | 9/1989 | Doering |
| 4,888,479 A | 12/1989 | Tamaru |
| 4,893,120 A | 1/1990 | Doering et al. |
| 4,916,308 A | 4/1990 | Meadows |
| 4,928,094 A | 5/1990 | Smith |
| 4,943,806 A | 7/1990 | Masters et al. |
| 4,980,547 A | 12/1990 | Griffin |
| 4,990,901 A | 2/1991 | Beiswenger |
| 5,025,314 A | 6/1991 | Tang et al. |
| 5,025,411 A | 6/1991 | Tallman et al. |
| 5,097,516 A | 3/1992 | Amir |
| 5,103,085 A | 4/1992 | Zimmerman |
| 5,105,186 A | 4/1992 | May |
| 5,109,435 A | 4/1992 | Lo et al. |
| 5,130,794 A | 7/1992 | Ritcher |
| 5,140,647 A | 8/1992 | Ise et al. |
| 5,148,015 A | 9/1992 | Dolan |
| 5,162,618 A | 11/1992 | Knowles |
| 5,162,783 A | 11/1992 | Moreno |
| 5,164,714 A | 11/1992 | Wehrer |
| 5,168,531 A | 12/1992 | Sigel |
| 5,179,369 A | 1/1993 | Person et al. |
| 5,196,835 A | 3/1993 | Blue et al. |
| 5,196,836 A | 3/1993 | Williams |
| 5,239,152 A | 8/1993 | Caldwell et al. |
| 5,239,373 A | 8/1993 | Tang et al. |
| 5,272,470 A | 12/1993 | Zetts |
| 5,317,140 A | 5/1994 | Dunthorn |
| 5,359,155 A | 10/1994 | Helser |
| 5,374,971 A | 12/1994 | Clapp et al. |
| 5,414,413 A | 5/1995 | Tamaru et al. |
| 5,422,494 A | 6/1995 | West et al. |
| 5,448,263 A | 9/1995 | Martin |
| 5,457,289 A | 10/1995 | Huang et al. |
| 5,483,261 A | 1/1996 | Yasutake |
| 5,483,603 A | 1/1996 | Luke et al. |
| 5,484,966 A | 1/1996 | Segan |
| 5,490,655 A | 2/1996 | Bates |
| 5,502,568 A | 3/1996 | Ogawa et al. |
| 5,525,764 A | 6/1996 | Junkins et al. |
| 5,528,263 A | 6/1996 | Platzker et al. |
| 5,528,290 A | 6/1996 | Saund |
| 5,537,107 A | 7/1996 | Funado |
| 5,554,828 A | 9/1996 | Primm |
| 5,581,276 A | 12/1996 | Cipolla et al. |
| 5,581,637 A | 12/1996 | Cass et al. |
| 5,591,945 A | 1/1997 | Kent |
| 5,594,469 A | 1/1997 | Freeman et al. |
| 5,594,502 A | 1/1997 | Bito et al. |
| 5,617,312 A | 4/1997 | Iura et al. |
| 5,638,092 A | 6/1997 | Eng et al. |
| 5,670,755 A | 9/1997 | Kwon |
| 5,686,942 A | 11/1997 | Ball |
| 5,698,845 A | 12/1997 | Kodama et al. |
| 5,729,704 A | 3/1998 | Stone et al. |
| 5,734,375 A | 3/1998 | Knox et al. |
| 5,736,686 A | 4/1998 | Perret, Jr. et al. |
| 5,737,740 A | 4/1998 | Henderson et al. |
| 5,739,479 A | 4/1998 | Davis-Cannon |
| 5,745,116 A | 4/1998 | Pisutha-Arnond |
| 5,764,223 A | 6/1998 | Chang et al. |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,790,910 A | 8/1998 | Haskin |
| 5,801,704 A | 9/1998 | Oohara et al. |
| 5,804,773 A | 9/1998 | Wilson et al. |
| 5,818,421 A | 10/1998 | Ogino et al. |
| 5,818,424 A | 10/1998 | Korth |
| 5,819,201 A | 10/1998 | DeGraaf |
| 5,825,352 A | 10/1998 | Bisset et al. |
| 5,831,602 A | 11/1998 | Sato et al. |
| 5,854,491 A | 12/1998 | Pryor et al. |
| 5,909,210 A | 6/1999 | Knox et al. |
| 5,911,004 A | 6/1999 | Ohuchi et al. |
| 5,914,709 A | 6/1999 | Graham et al. |
| 5,920,342 A | 7/1999 | Umeda et al. |
| 5,936,615 A | 8/1999 | Waters |
| 5,940,065 A | 8/1999 | Babb et al. |
| 5,943,783 A | 8/1999 | Jackson |
| 5,963,199 A | 10/1999 | Kato et al. |
| 5,982,352 A | 11/1999 | Pryor |
| 5,988,645 A | 11/1999 | Downing |
| 5,990,874 A | 11/1999 | Tsumura |
| 6,002,808 A | 12/1999 | Freeman |
| 6,008,798 A | 12/1999 | Mato, Jr. et al. |
| 6,029,214 A * | 2/2000 | Dorfman et al. ............... 710/73 |
| 6,031,531 A | 2/2000 | Kimble |
| 6,061,177 A | 5/2000 | Fujimoto |
| 6,075,905 A | 6/2000 | Herman et al. |
| 6,076,041 A | 6/2000 | Watanabe |
| 6,091,406 A | 7/2000 | Kambara et al. |
| 6,100,538 A | 8/2000 | Ogawa |
| 6,104,387 A | 8/2000 | Chery et al. |
| 6,118,433 A | 9/2000 | Jenkin et al. |
| 6,122,865 A | 9/2000 | Branc et al. |
| 6,128,003 A | 10/2000 | Smith et al. |
| 6,141,000 A | 10/2000 | Martin |
| 6,144,366 A | 11/2000 | Numazaki et al. |
| 6,147,678 A | 11/2000 | Kumar et al. |
| 6,153,836 A | 11/2000 | Gosyk |
| 6,161,066 A | 12/2000 | Wright et al. |
| 6,179,426 B1 | 1/2001 | Rodriquez, Jr. et al. |
| 6,188,388 B1 | 2/2001 | Arita et al. |
| 6,191,773 B1 | 2/2001 | Maruno et al. |
| 6,208,329 B1 | 3/2001 | Ballare |
| 6,208,330 B1 | 3/2001 | Hasegawa et al. |
| 6,209,266 B1 | 4/2001 | Branc et al. |
| 6,215,477 B1 | 4/2001 | Morrison et al. |
| 6,222,175 B1 | 4/2001 | Krymski |
| 6,226,035 B1 | 5/2001 | Korein et al. |
| 6,229,529 B1 | 5/2001 | Yano et al. |
| 6,232,962 B1 * | 5/2001 | Davis et al. ............... 345/177 |
| 6,252,989 B1 | 6/2001 | Geisler et al. |
| 6,256,033 B1 | 7/2001 | Nguyen |
| 6,262,718 B1 | 7/2001 | Findlay et al. |
| 6,310,610 B1 | 10/2001 | Beaton et al. |
| 6,320,597 B1 | 11/2001 | Ieperen |
| 6,323,846 B1 | 11/2001 | Westerman |
| 6,326,954 B1 | 12/2001 | Van Ieperen |
| 6,328,270 B1 | 12/2001 | Elberbaum |
| 6,335,724 B1 | 1/2002 | Takekawa et al. |
| 6,337,681 B1 | 1/2002 | Martin |

| | | |
|---|---|---|
| 6,339,748 B1 | 1/2002 | Hiramatsu |
| 6,346,966 B1 | 2/2002 | Toh |
| 6,352,351 B1 | 3/2002 | Ogasahara et al. |
| 6,353,434 B1 | 3/2002 | Akebi |
| 6,359,612 B1 | 3/2002 | Peter et al. |
| 6,362,468 B1 | 3/2002 | Murakami et al. |
| 6,377,228 B1 | 4/2002 | Jenkin et al. |
| 6,384,743 B1 | 5/2002 | Vanderheiden |
| 6,414,671 B1 | 7/2002 | Gillespie et al. |
| 6,414,673 B1 | 7/2002 | Wood et al. |
| 6,421,042 B1 | 7/2002 | Omura et al. |
| 6,427,389 B1 | 8/2002 | Branc et al. |
| 6,429,856 B1 | 8/2002 | Omura et al. |
| 6,429,857 B1 | 8/2002 | Masters et al. |
| 6,480,187 B1 * | 11/2002 | Sano et al. ............... 345/175 |
| 6,496,122 B2 | 12/2002 | Sampsell |
| 6,497,608 B2 | 12/2002 | Ho et al. |
| 6,498,602 B1 * | 12/2002 | Ogawa ............... 345/173 |
| 6,504,532 B1 | 1/2003 | Ogasahara et al. |
| 6,507,339 B1 | 1/2003 | Tanaka |
| 6,512,513 B2 * | 1/2003 | Fleck et al. ............... 345/179 |
| 6,512,838 B1 | 1/2003 | Rafii et al. |
| 6,517,266 B2 | 2/2003 | Saund |
| 6,518,600 B1 | 2/2003 | Shaddock |
| 6,522,830 B2 | 2/2003 | Yamagami |
| 6,529,189 B1 | 3/2003 | Colgan et al. |
| 6,530,664 B2 | 3/2003 | Vanderwerf et al. |
| 6,531,999 B1 | 3/2003 | Trajkovic |
| 6,532,006 B1 | 3/2003 | Takekawa et al. |
| 6,540,366 B2 | 4/2003 | Keenan et al. |
| 6,540,679 B2 | 4/2003 | Slayton et al. |
| 6,545,669 B1 | 4/2003 | Kinawi et al. |
| 6,559,813 B1 | 5/2003 | DeLuca et al. |
| 6,563,491 B1 | 5/2003 | Omura |
| 6,567,078 B2 | 5/2003 | Ogawa |
| 6,567,121 B1 | 5/2003 | Kuno |
| 6,570,103 B1 | 5/2003 | Saka et al. |
| 6,570,612 B1 | 5/2003 | Saund et al. |
| 6,577,299 B1 | 6/2003 | Schiller et al. |
| 6,587,099 B2 | 7/2003 | Takekawa |
| 6,590,568 B1 | 7/2003 | Astala et al. |
| 6,594,023 B1 | 7/2003 | Omura et al. |
| 6,597,348 B1 | 7/2003 | Yamazaki et al. |
| 6,597,508 B2 | 7/2003 | Seino et al. |
| 6,603,867 B1 | 8/2003 | Sugino et al. |
| 6,608,619 B2 | 8/2003 | Omura et al. |
| 6,614,422 B1 | 9/2003 | Rafii et al. |
| 6,624,833 B1 | 9/2003 | Kumar et al. |
| 6,626,718 B2 | 9/2003 | Hiroki |
| 6,630,922 B2 | 10/2003 | Fishkin et al. |
| 6,633,328 B1 | 10/2003 | Byrd et al. |
| 6,650,318 B1 | 11/2003 | Arnon |
| 6,650,822 B1 | 11/2003 | Zhou |
| 6,674,424 B1 | 1/2004 | Fujioka |
| 6,683,584 B2 | 1/2004 | Ronzani et al. |
| 6,690,357 B1 | 2/2004 | Dunton et al. |
| 6,690,363 B2 | 2/2004 | Newton |
| 6,690,397 B1 | 2/2004 | Daignault, Jr. |
| 6,710,770 B2 | 3/2004 | Tomasi et al. |
| 6,714,311 B2 | 3/2004 | Hashimoto |
| 6,720,949 B1 | 4/2004 | Pryor et al. |
| 6,736,321 B2 | 5/2004 | Tsikos et al. |
| 6,738,051 B2 | 5/2004 | Boyd et al. |
| 6,741,250 B1 | 5/2004 | Furlan et al. |
| 6,747,636 B2 | 6/2004 | Martin |
| 6,756,910 B2 | 6/2004 | Ohba et al. |
| 6,760,009 B2 | 7/2004 | Omura et al. |
| 6,760,999 B2 | 7/2004 | Branc et al. |
| 6,774,889 B1 | 8/2004 | Zhang et al. |
| 6,778,207 B1 | 8/2004 | Lee et al. |
| 6,803,906 B1 | 10/2004 | Morrison et al. |
| 6,828,959 B2 | 12/2004 | Takekawa et al. |
| 6,829,372 B2 * | 12/2004 | Fujioka ............... 382/103 |
| 6,864,882 B2 | 3/2005 | Newton |
| 6,911,972 B2 | 6/2005 | Brinjes |
| 6,919,880 B2 | 7/2005 | Morrison et al. |
| 6,927,384 B2 | 8/2005 | Reime et al. |
| 6,933,981 B1 | 8/2005 | Kishida et al. |
| 6,947,032 B2 | 9/2005 | Morrison et al. |
| 6,954,197 B2 | 10/2005 | Morrison et al. |
| 6,972,401 B2 | 12/2005 | Akitt et al. |
| 6,972,753 B1 | 12/2005 | Kimura et al. |
| 6,982,697 B2 * | 1/2006 | Wilson et al. ............... 345/156 |
| 7,002,555 B1 | 2/2006 | Jacobsen et al. |
| 7,007,236 B2 | 2/2006 | Dempski et al. |
| 7,015,418 B2 | 3/2006 | Cahill et al. |
| 7,030,861 B1 | 4/2006 | Westerman et al. |
| 7,057,647 B1 | 6/2006 | Monroe |
| 7,058,204 B2 | 6/2006 | Hildreth et al. |
| 7,075,054 B2 | 7/2006 | Iwamoto et al. |
| 7,084,857 B2 | 8/2006 | Lieberman et al. |
| 7,084,859 B1 | 8/2006 | Pryor |
| 7,084,868 B2 | 8/2006 | Farag et al. |
| 7,098,392 B2 | 8/2006 | Sitrick et al. |
| 7,121,470 B2 | 10/2006 | McCall et al. |
| 7,151,533 B2 | 12/2006 | Van Iperen |
| 7,176,904 B2 | 2/2007 | Satoh |
| 7,184,030 B2 | 2/2007 | McCharles et al. |
| 7,187,489 B2 | 3/2007 | Miles |
| 7,190,348 B2 * | 3/2007 | Kennedy et al. ............... 345/168 |
| 7,190,496 B2 | 3/2007 | Klug et al. |
| 7,202,860 B2 | 4/2007 | Ogawa |
| 7,227,526 B2 | 6/2007 | Hildreth et al. |
| 7,232,986 B2 | 6/2007 | Worthington et al. |
| 7,236,162 B2 | 6/2007 | Morrison et al. |
| 7,237,937 B2 | 7/2007 | Kawashima et al. |
| 7,242,388 B2 | 7/2007 | Lieberman et al. |
| 7,265,748 B2 | 9/2007 | Ryynanen |
| 7,268,692 B1 | 9/2007 | Lieberman |
| 7,274,356 B2 | 9/2007 | Ung et al. |
| 7,283,126 B2 | 10/2007 | Leung |
| 7,283,128 B2 | 10/2007 | Sato |
| 7,289,113 B2 | 10/2007 | Martin |
| 7,302,156 B1 | 11/2007 | Lieberman et al. |
| 7,305,368 B2 | 12/2007 | Lieberman et al. |
| 7,330,184 B2 | 2/2008 | Leung |
| 7,333,094 B2 | 2/2008 | Lieberman et al. |
| 7,333,095 B1 | 2/2008 | Lieberman et al. |
| 7,355,593 B2 | 4/2008 | Hill et al. |
| 7,372,456 B2 | 5/2008 | McLintock |
| 7,375,720 B2 | 5/2008 | Tanaka |
| RE40,368 E | 6/2008 | Arnon |
| 7,411,575 B2 | 8/2008 | Hill et al. |
| 7,414,617 B2 | 8/2008 | Ogawa |
| 7,479,949 B2 | 1/2009 | Jobs et al. |
| 7,492,357 B2 | 2/2009 | Morrison et al. |
| 7,499,037 B2 | 3/2009 | Lube |
| 7,532,206 B2 * | 5/2009 | Morrison et al. ............... 345/179 |
| 7,538,759 B2 | 5/2009 | Newton |
| 7,559,664 B1 | 7/2009 | Walleman et al. |
| 7,619,617 B2 | 11/2009 | Morrison et al. |
| 7,692,625 B2 | 4/2010 | Morrison et al. |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2001/0050677 A1 | 12/2001 | Tosaya |
| 2001/0055006 A1 | 12/2001 | Sano et al. |
| 2002/0008692 A1 | 1/2002 | Omura et al. |
| 2002/0015159 A1 | 2/2002 | Hashimoto |
| 2002/0036617 A1 | 3/2002 | Pryor |
| 2002/0041327 A1 | 4/2002 | Hildreth et al. |
| 2002/0050979 A1 | 5/2002 | Oberoi et al. |
| 2002/0064382 A1 | 5/2002 | Hildrerth et al. |
| 2002/0067922 A1 | 6/2002 | Harris |
| 2002/0075243 A1 | 6/2002 | Newton |
| 2002/0080123 A1 | 6/2002 | Kennedy et al. |
| 2002/0118177 A1 | 8/2002 | Newton |
| 2002/0145595 A1 | 10/2002 | Satoh |
| 2002/0163530 A1 | 11/2002 | Takakura et al. |
| 2003/0001825 A1 | 1/2003 | Omura et al. |
| 2003/0025951 A1 | 2/2003 | Pollard et al. |
| 2003/0043116 A1 | 3/2003 | Morrison et al. |
| 2003/0046401 A1 | 3/2003 | Abbott et al. |
| 2003/0063073 A1 | 4/2003 | Geaghan et al. |
| 2003/0071858 A1 | 4/2003 | Morohoshi |
| 2003/0085871 A1 | 5/2003 | Ogawa |
| 2003/0095112 A1 | 5/2003 | Kawano et al. |

| | | | |
|---|---|---|---|
| 2003/0137494 A1 | 7/2003 | Tulbert | |
| 2003/0142880 A1 | 7/2003 | Hyodo | |
| 2003/0151532 A1 | 8/2003 | Chen et al. | |
| 2003/0151562 A1 | 8/2003 | Kulas | |
| 2003/0156118 A1 | 8/2003 | Ayinde | |
| 2003/0161524 A1 | 8/2003 | King | |
| 2003/0210803 A1 | 11/2003 | Kaneda et al. | |
| 2003/0227492 A1 | 12/2003 | Wilde et al. | |
| 2004/0001144 A1 | 1/2004 | McCharles et al. | |
| 2004/0012573 A1 | 1/2004 | Morrison et al. | |
| 2004/0021633 A1 | 2/2004 | Rajkowski | |
| 2004/0031779 A1 | 2/2004 | Cahill et al. | |
| 2004/0032401 A1 | 2/2004 | Nakazawa et al. | |
| 2004/0046749 A1 | 3/2004 | Ideda | |
| 2004/0051709 A1 | 3/2004 | Ogawa et al. | |
| 2004/0071363 A1 | 4/2004 | Kouri et al. | |
| 2004/0108990 A1 | 6/2004 | Lieberman | |
| 2004/0125086 A1 | 7/2004 | Hagermoser et al. | |
| 2004/0149892 A1 | 8/2004 | Akitt et al. | |
| 2004/0150630 A1 | 8/2004 | Hinckley et al. | |
| 2004/0169639 A1 | 9/2004 | Pate et al. | |
| 2004/0178993 A1 | 9/2004 | Morrison et al. | |
| 2004/0178997 A1 | 9/2004 | Gillespie et al. | |
| 2004/0179001 A1 | 9/2004 | Morrison et al. | |
| 2004/0189720 A1 | 9/2004 | Wilson et al. | |
| 2004/0201575 A1 | 10/2004 | Morrison | |
| 2004/0204129 A1 | 10/2004 | Payne et al. | |
| 2004/0218479 A1 | 11/2004 | Iwamoto et al. | |
| 2004/0221265 A1 | 11/2004 | Leung et al. | |
| 2004/0252091 A1 | 12/2004 | Ma et al. | |
| 2005/0052427 A1 | 3/2005 | Wu et al. | |
| 2005/0057524 A1 | 3/2005 | Hill et al. | |
| 2005/0077452 A1 | 4/2005 | Morrison et al. | |
| 2005/0083308 A1 | 4/2005 | Homer et al. | |
| 2005/0104860 A1 | 5/2005 | McCreary et al. | |
| 2005/0128190 A1 | 6/2005 | Ryynanen | |
| 2005/0151733 A1 | 7/2005 | Sander et al. | |
| 2005/0156900 A1 | 7/2005 | Hill et al. | |
| 2005/0190162 A1 | 9/2005 | Newton | |
| 2005/0241929 A1 | 11/2005 | Auger et al. | |
| 2005/0243070 A1 | 11/2005 | Ung et al. | |
| 2005/0248539 A1 | 11/2005 | Morrison et al. | |
| 2005/0248540 A1 | 11/2005 | Newton | |
| 2005/0270781 A1 | 12/2005 | Marks | |
| 2005/0276448 A1 | 12/2005 | Pryor | |
| 2006/0012579 A1 | 1/2006 | Sato | |
| 2006/0022962 A1 | 2/2006 | Morrison et al. | |
| 2006/0028456 A1 | 2/2006 | Kang | |
| 2006/0034486 A1 | 2/2006 | Morrison et al. | |
| 2006/0152500 A1 | 7/2006 | Weng | |
| 2006/0158437 A1 | 7/2006 | Blythe et al. | |
| 2006/0170658 A1 | 8/2006 | Nakamura et al. | |
| 2006/0192799 A1 | 8/2006 | Vega et al. | |
| 2006/0197749 A1 | 9/2006 | Popovich | |
| 2006/0202953 A1 | 9/2006 | Pryor et al. | |
| 2006/0227120 A1 | 10/2006 | Eikman | |
| 2006/0244734 A1 | 11/2006 | Hill et al. | |
| 2006/0274067 A1 | 12/2006 | Hidai | |
| 2006/0279558 A1 | 12/2006 | Van Delden et al. | |
| 2007/0002028 A1 | 1/2007 | Morrison et al. | |
| 2007/0019103 A1 | 1/2007 | Lieberman et al. | |
| 2007/0075648 A1 | 4/2007 | Blythe et al. | |
| 2007/0075982 A1 | 4/2007 | Morrison et al. | |
| 2007/0089915 A1 | 4/2007 | Ogawa et al. | |
| 2007/0116333 A1 | 5/2007 | Dempski et al. | |
| 2007/0126755 A1 | 6/2007 | Zhang et al. | |
| 2007/0139932 A1 | 6/2007 | Sun et al. | |
| 2007/0152984 A1 | 7/2007 | Ording et al. | |
| 2007/0152986 A1 | 7/2007 | Ogawa et al. | |
| 2007/0165007 A1 | 7/2007 | Morrison et al. | |
| 2007/0167709 A1 | 7/2007 | Slayton et al. | |
| 2007/0205994 A1 | 9/2007 | van Ieperen | |
| 2007/0236454 A1 | 10/2007 | Ung et al. | |
| 2007/0269107 A1 | 11/2007 | Iwai et al. | |
| 2007/0273842 A1 | 11/2007 | Morrison | |
| 2007/0290996 A1 | 12/2007 | Ting | |
| 2007/0291125 A1 | 12/2007 | Marquet | |
| 2008/0029691 A1 | 2/2008 | Han | |
| 2008/0042999 A1 | 2/2008 | Martin | |

| | | | |
|---|---|---|---|
| 2008/0055262 A1 | 3/2008 | Wu et al. | |
| 2008/0055267 A1 | 3/2008 | Wu et al. | |
| 2008/0062140 A1 | 3/2008 | Hotelling et al. | |
| 2008/0062149 A1 | 3/2008 | Baruk | |
| 2008/0068352 A1 | 3/2008 | Worthington et al. | |
| 2008/0083602 A1 | 4/2008 | Auger et al. | |
| 2008/0106706 A1 | 5/2008 | Holmgren et al. | |
| 2008/0122803 A1 | 5/2008 | Izadi et al. | |
| 2008/0129707 A1 | 6/2008 | Pryor | |
| 2008/0259050 A1 | 10/2008 | Lin et al. | |
| 2008/0259052 A1 | 10/2008 | Lin et al. | |
| 2009/0058832 A1 | 3/2009 | Newton | |
| 2009/0058833 A1 | 3/2009 | Newton | |
| 2009/0146972 A1 | 6/2009 | Morrison et al. | |

FOREIGN PATENT DOCUMENTS

| | | |
|---|---|---|
| CA | 2058219 A1 | 4/1993 |
| CA | 2367864 A1 | 4/1993 |
| CA | 2219886 A1 | 4/1999 |
| CA | 2251221 A1 | 4/1999 |
| CA | 2267733 A1 | 10/1999 |
| CA | 2268208 A1 | 10/1999 |
| CA | 2252302 A1 | 4/2000 |
| CA | 2350152 A1 | 6/2001 |
| CA | 2412878 A1 | 1/2002 |
| CA | 2341918 A1 | 9/2002 |
| CA | 2386094 A1 | 12/2002 |
| CA | 2372868 A1 | 8/2003 |
| CA | 2390503 A1 | 12/2003 |
| CA | 2390506 A1 | 12/2003 |
| CA | 2432770 A1 | 12/2003 |
| CA | 2493236 A1 | 12/2003 |
| CA | 2448603 A1 | 5/2004 |
| CA | 2453873 A1 | 7/2004 |
| CA | 2460449 A1 | 9/2004 |
| CA | 2521418 A1 | 10/2004 |
| CA | 2481396 A1 | 3/2005 |
| CA | 2491582 A1 | 7/2005 |
| CA | 2563566 A1 | 11/2005 |
| CA | 2564262 A1 | 11/2005 |
| CA | 2501214 A1 | 9/2006 |
| CA | 2606863 A1 | 11/2006 |
| CA | 2580046 A1 | 9/2007 |
| CN | 1310126 C | 8/2001 |
| CN | 1784649 A | 6/2006 |
| CN | 101019096 A | 8/2007 |
| CN | 101023582 A | 8/2007 |
| CN | 1440539 A | 9/2009 |
| DE | 3836429 | 5/1990 |
| DE | 198 10 452 A1 | 12/1998 |
| DE | 60124549 | 9/2007 |
| EP | 0125068 A2 | 11/1984 |
| EP | 0279652 A | 8/1988 |
| EP | 0347725 A2 | 12/1989 |
| EP | 0420335 | 4/1991 |
| EP | 0 657 841 A1 | 6/1995 |
| EP | 0762319 A2 | 3/1997 |
| EP | 0829798 A2 | 3/1998 |
| EP | 0897161 A1 | 2/1999 |
| EP | 0911721 A2 | 4/1999 |
| EP | 1059605 A2 | 12/2000 |
| EP | 1262909 A2 | 12/2002 |
| EP | 1739528 A1 | 1/2003 |
| EP | 1739529 A1 | 1/2003 |
| EP | 1297488 B1 | 4/2003 |
| EP | 1420335 A2 | 5/2004 |
| EP | 1 450 243 A2 | 8/2004 |
| EP | 1457870 A2 | 9/2004 |
| EP | 1471459 A2 | 10/2004 |
| EP | 1517228 A2 | 3/2005 |
| EP | 1550940 A2 | 6/2005 |
| EP | 1611503 | 1/2006 |
| EP | 1674977 | 6/2006 |
| EP | 1741186 | 1/2007 |
| EP | 1766501 | 3/2007 |
| EP | 1830248 A1 | 9/2007 |
| EP | 1877893 | 1/2008 |
| ES | 2279823 T3 | 9/2007 |
| GB | 1575420 | 9/1980 |

| | | | |
|---|---|---|---|
| GB | 2176282 A | 5/1986 |
| GB | 2204126 A | 11/1988 |
| GB | 2263765 A | 8/1993 |
| JP | 57-211637 A | 12/1982 |
| JP | 61-196317 A | 8/1986 |
| JP | 61-260322 A | 11/1986 |
| JP | 62-005428 | 1/1987 |
| JP | 63-223819 | 9/1988 |
| JP | 3-054618 A | 3/1991 |
| JP | 03-244017 | 10/1991 |
| JP | 4-350715 A | 12/1992 |
| JP | 4-355815 A | 12/1992 |
| JP | 5-181605 A | 7/1993 |
| JP | 5-189137 A | 7/1993 |
| JP | 5-197810 A | 8/1993 |
| JP | 06-110608 | 4/1994 |
| JP | 7-110733 A | 4/1995 |
| JP | 7-230352 A | 8/1995 |
| JP | 8-016931 B2 | 2/1996 |
| JP | 8-108689 A | 4/1996 |
| JP | 8-240407 A | 9/1996 |
| JP | 8-315152 A | 11/1996 |
| JP | 9-091094 A | 4/1997 |
| JP | 9-224111 A | 8/1997 |
| JP | 9-319501 A | 12/1997 |
| JP | 10-105324 A | 4/1998 |
| JP | 10-222646 A | 8/1998 |
| JP | 11-051644 A | 2/1999 |
| JP | 11-064026 A | 3/1999 |
| JP | 11-085376 A | 3/1999 |
| JP | 11-110116 A | 4/1999 |
| JP | 11-203042 | 7/1999 |
| JP | 11-212692 | 8/1999 |
| JP | 2000-105671 A | 4/2000 |
| JP | 2000-132340 A | 5/2000 |
| JP | 2001-075735 A | 3/2001 |
| JP | 2001-142642 | 5/2001 |
| JP | 2001-282456 A | 10/2001 |
| JP | 2001-282457 A | 10/2001 |
| JP | 2002-055770 | 2/2002 |
| JP | 2002-236547 A | 8/2002 |
| JP | 2003-65716 A | 3/2003 |
| JP | 2003-158597 A | 5/2003 |
| JP | 2003-167669 A | 6/2003 |
| JP | 2003-173237 A | 6/2003 |
| JP | 2005-108211 A | 4/2005 |
| JP | 2005-182423 A | 7/2005 |
| JP | 2005-202950 A | 7/2005 |
| WO | 98/07112 A2 | 2/1998 |
| WO | 99/08897 A1 | 2/1999 |
| WO | 99/21122 A1 | 4/1999 |
| WO | 99/28812 A1 | 6/1999 |
| WO | 99/40562 A1 | 8/1999 |
| WO | 01/24157 A1 | 4/2001 |
| WO | 01/31570 A2 | 5/2001 |
| WO | 01/63550 A2 | 8/2001 |
| WO | 01/91043 A2 | 11/2001 |
| WO | 02/03316 A1 | 1/2002 |
| WO | 02/07073 A2 | 1/2002 |
| WO | 02/27461 A1 | 4/2002 |
| WO | 03/104887 A2 | 12/2003 |
| WO | 03/105074 A2 | 12/2003 |
| WO | 2004/072843 A1 | 8/2004 |
| WO | 2004/090706 A2 | 10/2004 |
| WO | 2004/102523 A1 | 11/2004 |
| WO | 2004/104810 A1 | 12/2004 |
| WO | 2005/031554 A1 | 4/2005 |
| WO | 2005034027 A1 | 4/2005 |
| WO | 2005/106775 A1 | 11/2005 |
| WO | 2005/107072 A1 | 11/2005 |
| WO | 2006/002544 A1 | 1/2006 |
| WO | 2006/092058 A1 | 9/2006 |
| WO | 2006/095320 A2 | 9/2006 |
| WO | 2006/096962 A1 | 9/2006 |
| WO | 2006/116869 A1 | 11/2006 |
| WO | 2007/003196 A2 | 1/2007 |
| WO | 2007/019600 A1 | 2/2007 |
| WO | 2007/037809 | 4/2007 |
| WO | 2007/064804 A1 | 6/2007 |
| WO | 2007/079590 | 7/2007 |
| WO | 2007/132033 A1 | 11/2007 |
| WO | 2007/134456 A1 | 11/2007 |
| WO | 2008/128096 A2 | 10/2008 |
| WO | 2009/029764 A1 | 3/2009 |
| WO | 2009/029767 A1 | 3/2009 |
| WO | 2009/146544 A1 | 12/2009 |
| WO | 2010/051633 A1 | 5/2010 |

OTHER PUBLICATIONS

Villamor et al. "Touch Gesture Reference Guide", Apr. 15, 2010.
"White Paper", Digital Vision Touch Technology, Feb. 2003.
International Search Report for PCT/CA2008/001350 mailed Oct. 17, 2008 (5 Pages).
International Search Report and Written Opinion for PCT/CA2004/001759 mailed Feb. 21, 2005 (7 Pages).
International Search Report and Written Opinion for PCT/CA2009/000773 mailed Aug. 12, 2009 (11 Pages).
European Search Opinion for EP 07 25 0888 dated Jun. 22, 2007 (2 pages).
European Search Report for EP 07 25 0888 dated Jun. 22, 2007 (2 pages).
May 12, 2009 Office Action for Canadian Patent Application No. 2,412,878 (4 pages).
Tapper, C.C., et al., "On-Line Handwriting Recognition—A Survey", Proceedings of the International Conference on Pattern Recognition (ICPR), Rome, Nov. 14-17, 1988, Washington, IEEE Comp. Soc. Press. US, vol. 2 Conf. 9, Nov. 14, 1988, pp. 1123-1132.
Press Release, "IntuiLab introduces IntuiFace, An interactive table and its application platform" Nov. 30, 2007.
Overview page for IntuiFace by IntuiLab, Copyright 2008.
NASA Small Business Innovation Research Program: Composite List of Projects 1983-1989, Aug. 1990.
*Touch Panel*, vol. 1 No. 1 (2005).
*Touch Panel*, vol. 1 No. 2 (2005).
*Touch Panel*, vol. 1 No. 3 (2006).
*Touch Panel*, vol. 1 No. 4 (2006).
*Touch Panel*, vol. 1 No. 5 (2006).
*Touch Panel*, vol. 1 No. 6 (2006).
*Touch Panel*, vol. 1 No. 7 (2006).
*Touch Panel*, vol. 1 No. 8 (2006).
*Touch Panel*, vol. 1 No. 9 (2006).
*Touch Panel*, vol. 1 No. 10 (2006).
*Touch Panel*, vol. 2 No. 1 (2006).
*Touch Panel*, vol. 2 No. 2 (2007).
*Touch Panel*, vol. 2 No. 3 (2007).
*Touch Panel*, vol. 2 No. 4 (2007).
*Touch Panel*, vol. 2 No. 5 (2007).
*Touch Panel*, vol. 2 No. 6 (2007).
*Touch Panel*, vol. 2 No. 7-8 (2008).
*Touch Panel*, vol. 2 No. 9-10 (2008).
*Touch Panel*, vol. 3 No. 1-2 (2008).
*Touch Panel*, vol. 3 No. 3-4 (2008).
*Touch Panel*, vol. 3 No. 5-6 (2009).
*Touch Panel*, vol. 3 No. 7-8 (2009).
*Touch Panel*, vol. 3 No. 9 (2009).
*Touch Panel*, vol. 4 No. 2-3 (2009).
Partial European Search Report for EP 03 25 7166 which was completed on May 19, 2006.
International Search Report with a date of mailing of Oct. 22, 2001 for PCT/CA 01/00980 with an International Filing Date of Jul. 5, 2001.
Bud K. Funk, CCDs in optical panels deliver high resolution, Electronic Design, Sep. 27, 1980, pp. 139-143.
Bernhard P. Wrobel, "Minimum Solutions for Orientation", Calibration and Orientation of Cameras in Computer Vision, Springer Series in Infomation Sciences, vol. 34, 2001, pp. 28-33.
Kenichi Kanatani, "Camera Calibration", Geometric Computation for Machine Vision, Oxford Engineering Science Series, vol. 37, 1993, pp. 56-63.
Richard Hartley and Andrew Zisserman, "Multiple View Geometry in Computer Vision", Cambridge University Press, First published 2000, Reprinted (with corrections) 2001, pp. 70-73, 92-93 and 98-99.

Wolfgang Förstner, "On Estimating Rotations", Festschrift für Prof. Dr.-Ing. Heinrich Ebner zum 60. Geburtstag, Herausg.: C. Heipke und H. Mayer, Lehrstuhl für Photogrammetrie und Fernerkundung, TU München, 1999, 12 pages. (http://www.ipb.uni-bonn.de/papers/#1999).
European Search Report for EP 04 25 1392 for a search that was completed on Jan. 11, 2007.
European Search Report for EP 06 01 9269 for a search that was completed on Nov. 9, 2006.
European Search Report for EP 06 01 9268 for a search that was completed on Nov. 9, 2006.
European Search Report for EP 02 25 3594 for a search that was completed on Dec. 14, 2005.
Fie-Yue Wang, et al., "Stereo camera calibration without absolute world coordinate information", SPIE, vol. 2620, pp. 655-662, Jun. 14, 1995.
Notification of Transmittal of the International Search Report and the Written Opinion of the International Searching Authority regarding International Application No. PCT/CA2007/002184, as mailed on Mar. 13, 2008.
International Preliminary Report on Patentability, PCT/NZ2004/000029, May 20, 2005 (21 pages).
"International Preliminary Report on Patentability", PCT/US2008/060102, Oct. 22, 2009 (9 pages).
International Search Report for PCT/CA2010/001085 mailed Oct. 12, 2010 (5 pages).
"International Application Serial No. PCT/US2008/060102, Search Report & Written opinion mailed Feb. 12, 2009" (14 pages).
International Application Serial No. PCT/US2008/074749, Search Report & Written Opinion mailed Feb. 11, 2009 (10 pages).
"International Application Serial No. PCT/US2008/074755, International Search Report and Written Opinion mailed Jan. 29, 2009" (14 pages).
International Search Report for PCT/NZ05/00092 Sep. 27, 2006 (4 pages).
Loinaz et al., "A 200-mW, 3.3-V, CMOS Color Camera IC Producing 352×288 24-B Video at 30 Frames/s," IEEE Journal of Solid-StateCircuits,vol. 31,No. 12,Dec. 1998, pp. 2092-2103.
Yawcheng Lo, "Solid-state image sensor: technologies and applications," Input/Output and Imaging Technologies, Y.T. Tsai, T-M. Kung, and J. Larsen, eds. SPIE Proceedings vol. 3422, pp. 70-80 (1998).
*Touch Panel*, vol. 5 No. 2-3 (Sep. 2010).
*Touch Panel*, vol. 5 No. 4 (Nov. 2010).
"Store Window Presentations", Heddier Electronic.
"ThruGlass", Projected Capacitive Touchscreencs Specifications, Micro Touch.
Benko, et al., "Precise Selection Techniques for Multi-Touch Screens", Proc. ACM CHI 2006: Human Factors in Computer Systems, pp. 1263-1272.
Buxton, W., "Issues and Techniques in Touch-Sensitive Tablet Input," Computer Graphics, 19(3), Proceedings of SIGGRAPH '85, 1985, pp. 215-223.
VGA-format CMOS Camera-on-a-Chip for Multimedia Applications, Photobit Corporation, 1999 (2 pages).
English Translation of Decision of Rejection for Japanese Patent Application No. 2002-507309, date of Decision: Aug. 18, 2011, 9 pages.

* cited by examiner

DATA IMAGE 95

FIG. 8a

FIT ITERATION K = 12

VIP AND FIT

FIG. 8d

DATA IMAGE 152

FIG. 9a

FIT ITERATION K = 12

VIP AND FIT

FIG. 9d

SYSTEM AND METHOD FOR DIFFERENTIATING BETWEEN POINTERS USED TO CONTACT TOUCH SURFACE

This application is a continuation of U.S. patent application Ser. No. 10/384,783, filed Mar. 11, 2003, the contents of which are incorporated herein by reference.

FIELD OF THE INVENTION

The present invention relates generally to touch systems and in particular to a touch system and method for differentiating between pointers used to contact a touch surface.

BACKGROUND OF THE INVENTION

Touch systems are well known in the art and typically include a touch screen having a touch surface on which contacts are made using a pointer. Pointer contacts with the touch surface are detected and are used to generate corresponding output pointer position data representing areas of the touch surface where the pointer contacts are made. There are basically two general types of touch systems available and they can be broadly classified as "active" touch systems and "passive" touch systems.

Active touch systems allow a user to generate pointer position data by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate pointer position data by contacting the touch surface with a passive pointer and do not require the use of special pointers in order to activate the touch surface. A passive pointer can be a finger, a cylinder of some material, or any other suitable object that can be used to contact some predetermined area of interest on the touch surface. Since special active pointers are not necessary in passive touch systems, battery power levels and/or pointer damage, theft, or pointer misplacement are of no concern to users.

Although passive touch systems provide advantages over active touch systems, many prior art passive touch systems suffer disadvantages in that they are generally not able to tell what type of pointer is used to contact the touch surface i.e. whether a contact is made using a finger, stylus, pen, or the like.

To deal with this shortcoming, techniques have been considered to provide the ability to differentiate between pointers used to contact a touch surface. For example, U.S. Pat. No. 5,448,263 to Martin, assigned to SMART Technologies, Inc., assignee of the present invention, discloses a passive touch system including an analog resistive touch screen coupled to a computer. Image data generated by the computer is conveyed to a projector, which in turn projects a corresponding image on the touch surface of the touch screen. When a user contacts the touch surface of the touch screen, the touch screen generates pointer position data that is conveyed to the computer. Depending on the mode of operation of the touch system, the computer either records the pointer position data as writing or uses the pointer position data to control execution of an application programs executed by the computer. The computer also updates the image data so that the image presented on the touch surface by the projector reflects the pointer activity.

To assist the user in making pointer contacts on the touch surface, a tool tray is disposed adjacent the bottom edge of the touch surface. The tool tray includes a number of slots, each slot of which accommodates a different colored pen. When a pen is lifted from its slot, the touch screen generates pen color data that is conveyed to the computer allowing the computer to determine the color of the lifted pen. With the pen color known, when the touch system is in a write mode and the pen is used to contact the touch surface, the computer uses the pointer position data and the pen color data to update the image data so that writing in the color of the selected pen is projected onto the touch surface.

International PCT Application No. PCT/CA01/00980 filed on Jul. 5, 2001 and published under number WO 02/03316 on Jan. 10, 2002, assigned to SMART Technologies, Inc., assignee of the present invention, discloses a camera-based touch system comprising a touch screen that includes a passive touch surface on which a computer-generated image is presented. A rectangular bezel or frame surrounds the touch surface and supports digital cameras at its corners. The digital cameras have overlapping fields of view that encompass and look along the touch surface. The digital cameras acquire images of the touch surface from different locations and generate image data. The image data acquired by the cameras is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer relative to the touch surface using triangulation. The pointer location data is conveyed to a computer executing one or more application programs. The computer uses the pointer location data to update the computer-generated image that is presented on the touch surface. Pointer contacts on the touch surface can therefore be recorded as writing or used to control execution of an application program executed by the computer. Similar to the touch system disclosed in U.S. Pat. No. 5,448,263, the camera-based touch system also includes a tool tray accommodating a number of different colored pens that provides pen color data to the computer when a pen is lifted from the tool tray.

Although the above touch systems provide for discrimination between different color pens confusion can occur. For example, if a user lifts a pen from its slot in the tool tray and then uses a finger to write on the touch surface with the pen slot vacant, the computer will treat the pointer position data generated by the touch screen in response to the finger contact as if the pointer position data was generated in response to contacts made using the lifted pen.

Touch systems that treat pointer position data differently depending on the areas of the touch surface where contacts are made also exist. In these touch systems, when a computer desktop image is projected onto the touch surface, areas on the touch surface where inherent computer operating display elements such as tool bars, icons etc. are presented, are treated as non-active areas. Pointer contacts on the touch surface over the non-active areas are treated as mouse events irrespective of the type of pointer used to contact the touch surface. Pointer contacts on the touch surface within active areas are treated as writing. Although this type of touch system allows pointer contacts to be differentiated, differentiation of the pointer contacts is based on the areas of the touch surface where contacts are made and not based on pointer type. As will be appreciated touch systems that provide for better differentiation between pointers used to contact touch surfaces are desired.

It is therefore an object of the present invention to provide a novel touch system and method for differentiating between pointers used to contact a touch surface.

SUMMARY OF THE INVENTION

According to one aspect of the present invention there is provided a touch system comprising:

a touch surface to be contacted by a pointer;

at least one imaging device having a field of view looking generally along said touch surface; and at least one processor communicating with said at least one imaging device and analyzing images acquired by said at least one imaging device to: (i) determine the type of pointer used to contact said touch surface; and (ii) determine the location on said touch surface where pointer contact is made.

According to another aspect of the present invention there is provided a method of updating image data used to present a displayed image on a touch surface in response to pointer contact on said touch surface, said method comprising the steps of:

displaying an image on said touch surface;

generating pointer position data in response to pointer contact with said touch surface and acquiring images of pointers used to contact said touch surface;

analyzing the acquired images to determine the type of pointer used to contact the touch surface; and updating image data used to present the displayed image on said touch surface based on the generated pointer position data and the determined type of pointer.

According to yet another aspect of the present invention there is provided in a touch system including a touch surface, at least one pen tool to contact said touch surface, a processor recording data generated in response to contacts made on said touch surface using said at least pen tool and a camera to acquire an image of said at least one pen tool when said at least one pen tool is generally in contact with said touch surface, a method of updating recorded data comprising the steps of:

examining the acquired image to determine which end of the at least one pen tool is used to contact the touch surface; and modifying the recorded data based on the end of the at least one pen tool that is used to contact the touch surface.

According to yet another aspect of the present invention there is provided in a touch system including a touch surface on which an image is presented, a processor responsive to contacts made on the touch surface using a pointer and generating image data used to present said image, a method of updating said image data comprising the step of:

assessing a pointer attribute to determine the type of pointer used to make said contacts; and updating the image data based on the type of pointer and the pointer activity on the touch surface.

According to still yet another aspect of the present invention there is provided a touch system comprising:

a touch surface on which an image is presented; and a processor responsive to pointer contacts on the touch surface and generating image data that is used to present said image, said processor assessing a pointer attribute to determine the type of pointer used to make contacts and updating the image data based on the type of pointer and the pointer activity on the touch surface.

According to still yet another aspect of the present invention there is provided a camera-based touch system comprising:

a pair of cameras at spaced locations having overlapping fields of view encompassing an area on which pointer contacts are to be made, said cameras acquiring images and generating corresponding image data; and a processor receiving and processing the image data generated by said cameras to determine the location of a pointer relative to the area when the pointer is captured in images acquired by the cameras and analyzing the image data to determine the type of pointer used to contact the area.

According to still yet another aspect of the present invention there is provided an interactive input system comprising:

at least one imaging device having an input region within its field of view into which a pointer is moved to generate user input; and at least one processor communicating with said at least one imaging device and analyzing each image acquired by said at least one imaging device to determine the type of pointer moved into said input region.

The present invention provides advantages in that the type of pointer used to contact the touch surface is determined automatically. This enables the touch system to differentiate between contacts made on the touch surface using a finger and pen tool accurately and quickly. As a result, a user is provided with the ability to write, draw or annotate with a pen tool and then immediately use a finger to generate mouse events and manipulate the pen tool input without having to put the pen tool down. This provides the user with a seamless ability to write into and control application programs without purposefully having to change the mode of operation of the touch system prior to initiating touch events with different pointers.

Furthermore, since the type of pointer used to contact the touch surface is determined automatically, the need for tool tray electronics that generate pointer color data when a pointer is lifted from the tool tray is reduced or eliminated. This of course reduces costs.

In addition, since pointer contacts and pointer type are determined from images, multiple simultaneous contacts on the touch surface using different pointers can be determined.

The present invention also provides advantages in that since the touch system is able to differentiate between pointer tip and pointer backend contacts with the touch surface, different functions can be assigned to opposite ends of a pointer. As a result, a single pointer can be used to perform both a writing function and an erase function without purposefully having to change the mode of operation of the touch system. Using a pointer backend to initiate an erase function is of course highly user intuitive. Providing identifying glyphs on or shaping the tips of different pointers uniquely also allows different attributes, such as colors assigned to the different pointers, to be determined automatically.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

The present invention relates to a touch system and method that differentiates between pointers used to contact a touch surface so that pointer position data generated in response to a pointer contact with the touch surface can be processed in accordance with the type of pointer used to contact the touch surface. The touch system includes a touch surface to be contacted by a pointer and at least one imaging device having a field of view looking generally along the touch surface. At least one processor communicates with the at least one imaging device and analyzes images acquired by the at least one imaging device to determine the type of pointer used to contact the touch surface and the location on the touch surface where pointer contact is made. The determined type of pointer and the location on the touch surface where the pointer contact is made are used by a computer to control execution of an application program executed by the computer. Preferred embodiments of the present invention will now be described with reference to FIGS. 1 to 10.

Figure 1:
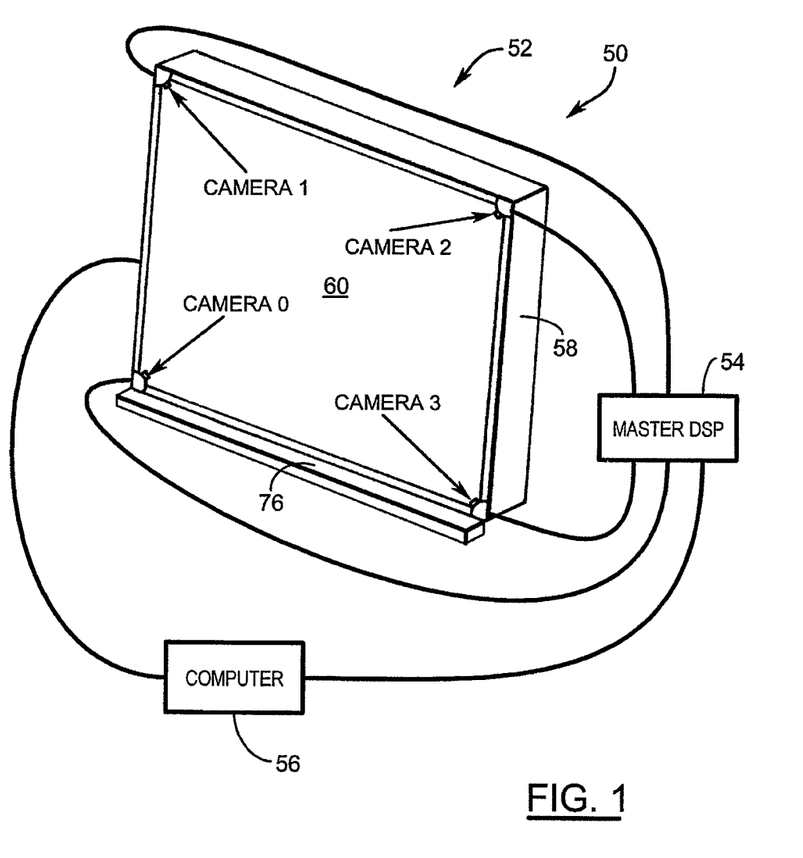
FIG. 1 is a schematic diagram of a camera-based touch system in accordance with the present invention.
Figure 2:
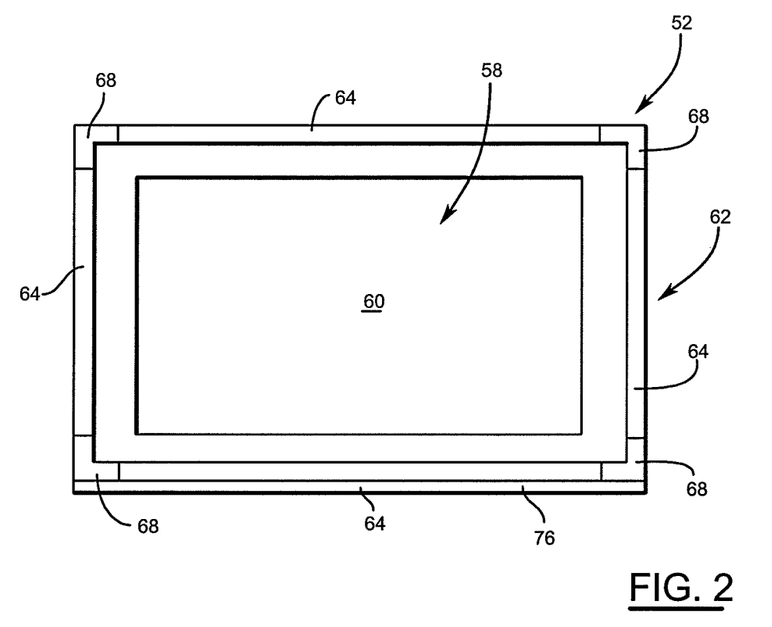
FIG. 2 is a front elevation view of a touch screen forming part of the touch system of FIG. 1.

Turning now to FIGS. 1 and 2, a camera-based touch system in accordance with the present invention is shown and is generally identified by reference numeral 50. Camera-based touch system 50 is similar to that disclosed in U.S. patent application Ser. No. (not available) for an invention entitled "Illuminated Bezel and Touch System Incorporating Same" filed on Jan. 30, 2003 assigned to SMART Technologies Inc., assignee of the present invention, the content of which is incorporated herein by reference. As can be seen, touch system 50 includes a touch screen 52 coupled to a digital signal processor (DSP) based master controller 54. Master controller 54 is also coupled to a computer 56. Computer 56 executes one or more application programs and provides computer-generated image output that is presented on the touch screen 52. The touch screen 52, master controller 54 and computer 56 form a closed-loop so that pointer contacts with the touch screen 52 can be recorded as writing or drawing or used to control execution of an application program executed by the computer 56.

FIG. 2 better illustrates the touch screen 52. Touch screen 52 in the present embodiment includes a high-resolution display device such as a plasma display 58, the front surface of which defines a touch surface 60. The touch surface 60 is bordered by an illuminated bezel or frame 62 coupled to the display device. Illuminated bezel 62 includes elongate side frame assembly 64 that are coupled to the sides of the plasma display 58. Each side frame assembly 64 accommodates a generally continuous illumination source 66. The ends of the side frame assembly 64 are joined by corner pieces 68 that house DSP-based CMOS digital cameras 70. Each digital camera is mounted within its respective corner piece 68 so that its field of view encompasses and looks across the entire touch surface 60.

Figure 6A:
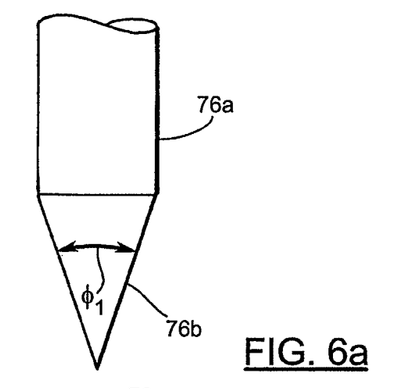
FIGS. 6a and 6b are elevation views of pen tools forming part of the touch screen of FIG. 2.
Figure 6B:
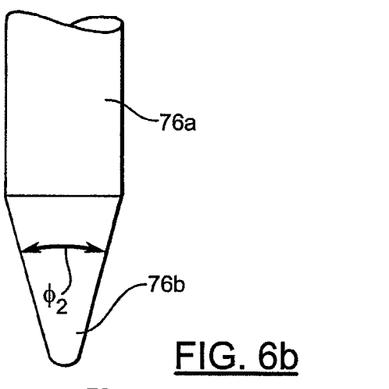

A tool tray 76 is positioned adjacent the bottom edge of the touch surface 60 and accommodates a plurality of different color pointers in the form of pen tools 76a used to contact the touch surface 60 as shown in FIGS. 6a and 6b. Each pen tool has a generally conical tip 76b defining an opening angle ø. The opening angle is an invariant property of the pen tool irrespective of the pen tool orientation when captured in an image. In the present embodiment, the tool tray 76 is passive and simply provides a convenient location to place the pen tools. If desired however, the tool tray 76 may include active functionality.

Figure 3:
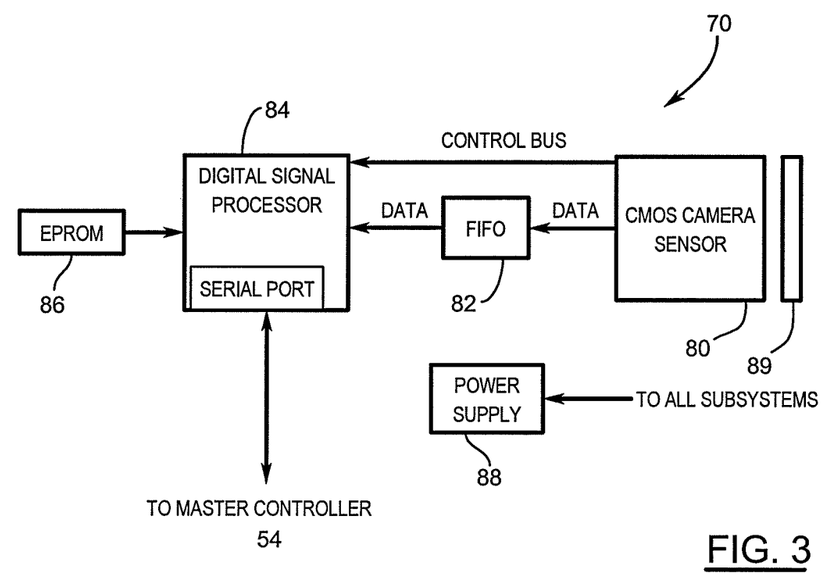
FIG. 3 is a schematic diagram of a digital camera forming part of the touch screen of FIG. 4.

One of the digital cameras within a corner piece 68 is shown in FIG. 3. As can be seen, each digital camera 70 includes a two-dimensional CMOS image sensor and associated lens assembly 80, a first-in-first-out (FIFO) buffer 82 coupled to the image sensor and lens assembly 80 by a data bus, and a digital signal processor (DSP) 84 coupled to the FIFO 82 by a data bus and to the image sensor and lens assembly 80 by a control bus (see FIG. 4). A boot EPROM 86 and a power supply subsystem 88 are also included. In the present embodiment, the CMOS camera image sensor is configured for a 20×648 pixel subarray that can be operated to capture image frames at rates in excess of 200 frames per second since arbitrary pixel rows can be selected. Also, since the pixel rows can be arbitrarily selected, the pixel subarray can be exposed for a greater duration for a given digital camera frame rate allowing for good operation in dark rooms as well as in lit rooms.

The DSP 84 provides control information to the image sensor and lens assembly 80 via the control bus. The control information allows the DSP 84 to control parameters of the image sensor and lens assembly 80 such as exposure, gain, array configuration, reset and initialization. The DSP 84 also provides clock signals to the image sensor and lens assembly 80 to control the frame rate of the image sensor and lens assembly 80.

An infrared pass filter 89 is provided on the digital camera image sensor and lens assembly 80 to blind the digital camera 70 to frequencies of light other than the light broadcasted by the illuminated bezel 62.

Figure 4:
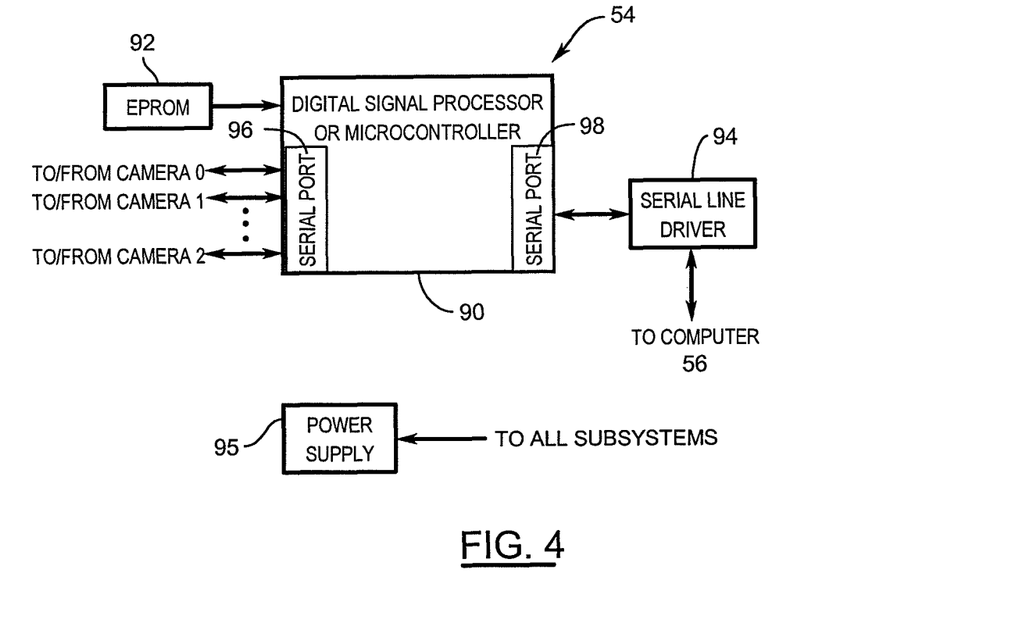
FIG. 4 is a schematic diagram of a master controller forming part of the touch system of FIG. 1.

Master controller 54 is best illustrated in FIG. 4 and includes a DSP 90, a boot EPROM 92, a serial line driver 94 and a power supply subsystem 95. The DSP 90 communicates with the DSPs 84 of the digital cameras 70 over a data bus via a serial port 96 and communicates with the computer 56 over a data bus via a serial port 98 and the serial line driver 94.

The master controller 54 and each digital camera 70 follow a communication protocol that enables bi-directional communications via a common serial cable similar to a universal serial bus (USB). The transmission bandwidth is divided into thirty-two (32) 16-bit channels. Of the thirty-two channels, six (6) channels are assigned to each of the DSPs 84 in the digital cameras 70 in to the DSP 90 and the master controller 54 and the remaining two (2) channels are unused. The master controller 54 monitors the twenty-four (24) channels assigned to the DSPs 84 while the DSPs 84 monitor the six (6) channels assigned to the DSP 90 of the master controller 54. Communications between the master controller 54 and the digital camera 70 are performed as background processes in response to interrupts.

The operation of the touch system 50 will now be described. Each digital camera 70 acquires images looking along the touch surface 60 within the field of view of its image sensor and lens assembly 80 at a desired frame rate and processes each acquired image to determine if a pointer is in the acquired image. During image capture, the illuminated bezel provides adequate backlighting for the digital cameras 70. If a pointer is in the acquired image, the image is further processed to determine characteristics of the pointer contacting or hovering above the touch surface 60 such as pointer type. Pointer information packets (PIPs) including pointer characteristics, status and/or diagnostic information are then generated by the digital camera 70 and the PIPs are queued for transmission to the master controller 54. The digital cameras 70 also receive and respond to command PIPs generated by the master controller 54.

The master controller 54 polls the digital cameras 70 for PIPs. If the PIPs include pointer characteristic information, the master controller 54 triangulates pointer characteristics in the PIPs to determine the position of the pointer relative to the touch surface 60 in Cartesian rectangular coordinates and the type of pointer used to contact the touch surface 60. The master controller 54 in turn transmits calculated pointer position data, pointer type data, status and/or diagnostic information to the computer 56. In this manner, the pointer position data transmitted to the computer 56 can be recorded as writing or drawing or can be used to control execution of an applications program executed by the computer 56 depending on the type of pointer used to contact the touch surface 60. The computer 56 also updates the computer-generated image output conveyed to the plasma display 58 so that the information presented on the touch surface 60 reflects the pointer activity.

The master controller 54 also receives commands from the computer 56 and responds accordingly as well as generates and conveys commands to the digital camera 70. Specifics concerning the triangulation of pointer characteristics in PIPs are described in PCT Application No. WO 02/03316, assigned to SMART Technologies, Inc., assignee of the present invention, the content of which is incorporated herein by reference. Accordingly, specifics will not be described herein.

To enable automatic pointer discrimination, each DSP 84 is programmed to analyze the acquired images to determine whether a pen tool, or a finger is used to contact the touch surface 60. Each DSP 84 reports the determined pointer type to the master controller 54, which in turn reports the pointer type and pointer position to the computer 56. In this manner, since each DSP 84 can differentiate between the types of pointers used to contact the touch surface 60, the function assigned to each pointer can be determined from the images acquired by the digital cameras 70. This allows the computer 56 to process the pointer position and pointer type data and update the image data in the appropriate manner.

Figure 5A:
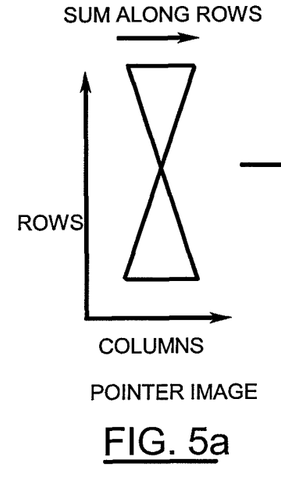
FIGS. 5a, 5b and 5c show the steps performed by the computer during computation of a curve of growth.
Figure 5B:
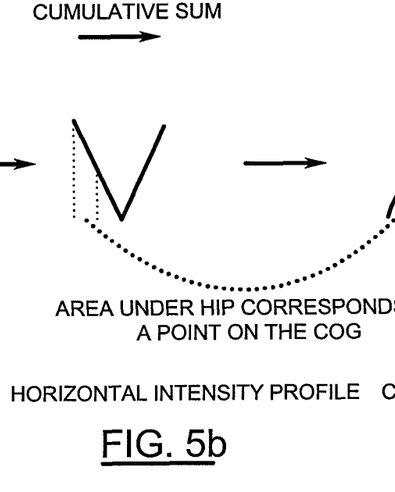
Figure 5C:
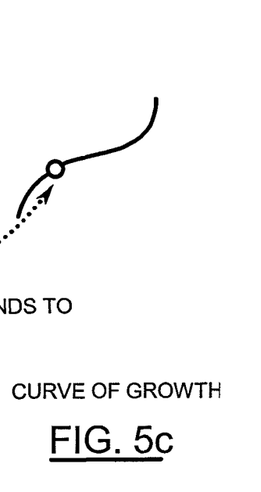

In order to determine the type of pointer used to contact the touch surface 60 from the images acquired by the digital cameras 70, each DSP 84 uses a curve of growth method to differentiate between different pointers. During this method, a horizontal intensity profile (HIP) is formed by calculating a sum along each row of pixels in the images (FIG. 5a) thereby to produce a one-dimensional profile having a number of points equal to the row dimension of the image (see FIG. 5b). A curve of growth is then generated from the HIP by forming the cumulative sum from the HIP (FIG. 5c). In other words, starting at the left most point of the HIP, a successive integration of the HIP from the left most point of the HIP to the right most point of the HIP is performed. The resulting integrated area corresponds to a specific point on the curve of growth. For a pen tool, the curve of growth has a distinct non-linear shape, while for a finger tip, the curve of growth is very close to linear. This is due to the fact that the tip of the pen tool is generally conical whereas a fingers tip is generally cylindrical. To distinguish between non-linear and linear curves of growth, a least-squares line is fitted to the curve of growth, the linear trend from the curve of growth is subtracted and the sum of squares of residuals (otherwise known as $2v\chi$) is formed. The sum of squares of residuals is defined as:

$$X_v^2 = \frac{1}{N-2} \sum_{i=1}^{N} [COG - CALC]^2$$

The factor of N−2 is the number of degrees of freedom for a linear fit to N points. This number reduces the problem of pointer-finger recognition to just examining the value of the sum of squares of residuals. If the sum of squares of residuals is close to 1, then a finger tip is present while if it is much larger than a pen tool is present.

In the present embodiment, when the DSPs 84 identify the pointer that is used to contact the touch surface as a finger, the computer 56 treats the pointer contact as a mouse event. In this manner, a user is able to use a finger to manipulate (i.e. move, resize etc.) pen tool writing or control execution of an applications program with a pen tool in hand without having to change the mode of operation of the touch screen 52. When the DSPs 84 identify the pointer that is used to contact the touch surface as a pen tool, the computer 56 treats the pointer position data as writing.

If desired, different pen tools can be provided with uniquely shaped conical tips and assigned different attributes, each conical tip having a unique opening angle as shown in FIGS. 6a and 6b. In this case, if a pen tool is used to contact the touch surface 60, the DSPs 84 further analyze the images to recognize the unique shape of the pen tool tip.

To differentiate between different pen tools, the curves of growth are examined. Since the tip of each pen tool has its own unique shape, the curve of growth generated for each pen tool is different. This allows different pen tools used to contact the touch surface 60 to be determined. For example, if each pen tool is assigned a different color, the unique curve of growth generated for each pen tool can be used to assign the appropriate color to the pen tool so that writing made on the touch surface 60 using each pen tool appears in the appropriate color.

Although the pen tools are described as having conical tips with different opening angles, the various pen tools can be formed with different shaped tips of virtually any configuration that result in unique curves of growth being generated to provide for pointer discrimination.

Figure 7A:
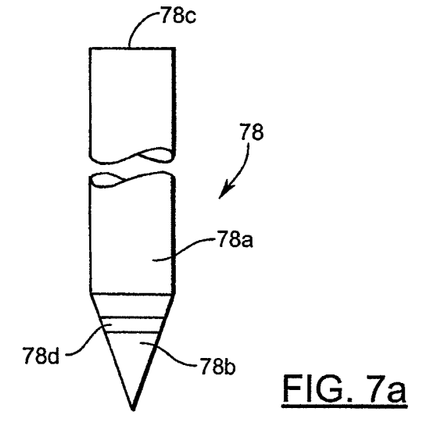
FIGS. 7a and 7b are elevation views of alternative pen tools forming part of the touch screen of FIG. 2.
Figure 7B:
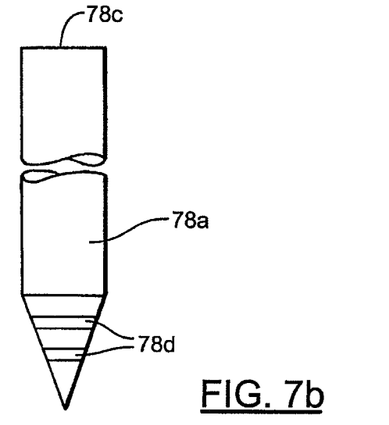
Figure 8A:
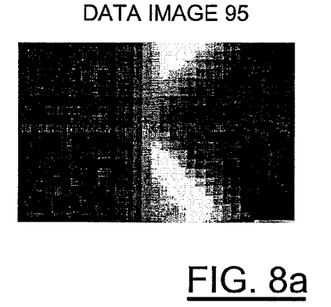
FIGS. 8 and 9 show typical fitting results generated by a computer forming part of the touch system of FIG. 1 in response to touch surface contacts made using a pen tool and finger, respectively.
Figure 8B:
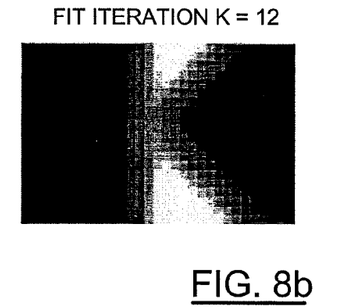
Figure 8C:
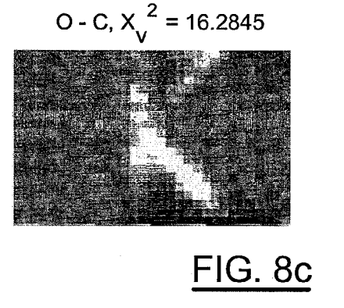
Figure 8D:
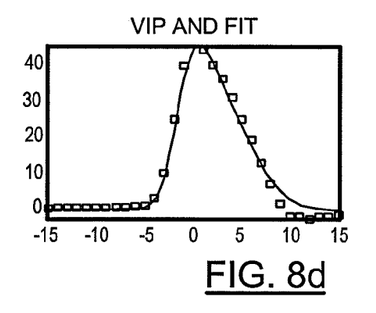
Figure 9A:
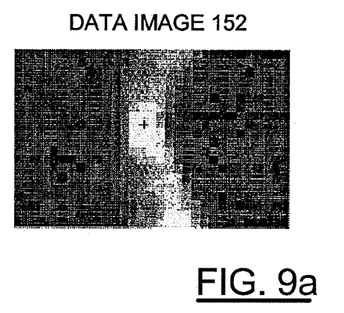
Figure 9B:
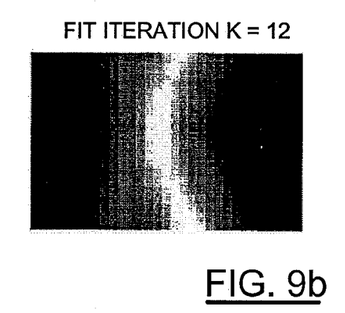
Figure 9C:
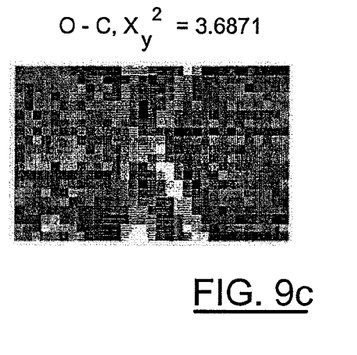
Figure 9D:
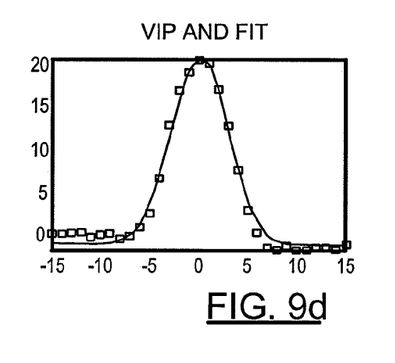

FIGS. 7a and 7b show alternative pen tools 78. In this embodiment, each pen tool 78 includes a cylindrical body 78a having a generally conical tip 78b at one end and a square backend 78c. A glyph or distinguishing mark 78d is provided on the pen tool 78 adjacent its tip 78b. The glyph 78d on each pen tool is different and represents a unique attribute, such as color, assigned to the pen tool. For example, in the present embodiment, the red pen tool has a single V-shaped groove on its tip 78b turned along the axis of the pen tool. The blue pen has two V-grooves on its tip 78b turned along the axis of the pen tool. The green pen has three V-shaped grooves on its tip 78b turned along the axis of the pen tool. The black pen tool is devoid of a glyph on its tip 78b. If the touch screen 52 includes additional different colored pen tools, different shaped glyphs are provided on the tips of these additional pen tools to allow the touch system 50 to determine their colors.

Although the operation of the touch system is described with reference to single contacts made on the touch surface 60, as will be appreciated by those skilled in the art, since camera images are used to determine pointer contacts, multiple pointer contacts on the touch surface 60 can be determined since each pointer will appear in the images captured by each camera. The type of each pointer can be determined in the same manner described above and used during processing of the resulting pointer location data. In this manner a user may contact the touch surface simultaneously with different color pen tools or with a pen tool an a finger.

In this embodiment, rather than relying on curves of growth to differentiate between the pointer used to contact the touch surface, each DSP 84 uses an artificial neural network (ANN) to determine the type of pointer used to contact the touch surface 60 from the images. As is well known ANN's are ideally suited to solving problems of an ambiguous nature such as multi-parameter target detection when the parameters are not known. There are no specific algorithms, procedures, or rules that are pre-programmed in an ANN, rather only a training method. The training method allows the ANN to establish its own set of parameters and rules to solve the pattern recognition problem.

In the present embodiment, the ANN is specifically trained to analyze the images acquired by the digital cameras 70 and recognize whether a pointer tip, a pointer backend, or a finger is used to contact the touch surface 60. During the analysis of each camera image, the ANN generates decision output that identifies the pointer used to contact the touch surface 60 with some degree of probability. For each set of images acquired by the digital cameras 70, the ANN decision output with the highest degree of probability is used by the computer 56.

When the ANN decision output identifies the pointer that is used to contact the touch surface 60 as a finger, the computer 56 treats the pointer contact data as a mouse event. In this manner, a user is able to use a finger to manipulate (i.e. move, resize etc.) pen tool writing input or control execution of application programs with a pen tool in hand without having to change the mode of operation of the touch screen. When the ANN decision output identifies the pointer that is used to contact the touch surface 60 as a pointer backend 78c, the computer 56 treats the pointer as an erase tool. The pointer backend makes a nice intuitive erase tool because the pen tool itself works like a pencil, its shape is distinct and it avoids the need for pointers to be switched in order to perform an erase function.

When the ANN decision output identifies the pointer that is used to contact the touch surface 60 as a pointer tip 78b, the computer 56 treats the pointer position data as writing or drawing. In order to determine the color to be assigned to the writing or drawing, the ANN further analyses the images acquired by the digital cameras 70 to recognize the glyph 78d on the pointer tip 78b, since the glyph on the pointer tip 78b represents the color assigned to the pen tool.

During image analyses, a model fitting approach is used wherein each gray-level value at each pixel (i.e., (x, y) location) of a difference image is described by a model of several parameters. These model parameters include:

the mean gray level within the pointer, and that in the background;

the (x,y) location of the pointer tip 78b;

the orientation angles of the leading and trailing edges of the pointer tip; and the resolution of the digital cameras 70 used to acquire the images.

The mathematical model functions are combinations of Gaussian error functions as disclosed by Blaszka, T. and Deriche, R. in "Recovering and Characterizing Image Features Using an Efficient Model Based Approach", 1994, Rapport de recherche No. 2422, INRIA. Images are compared pixel-by-pixel, in order to fit the model to the image Statistically, this comparison is performed using the reduced chi-squared statistic $$\chi_v^2 = \frac{1}{N-M} \sum_{i,j} [I_{i,j}^{obs} - I_{i,j}^{calc}]^2$$

Here, $v=N-M$ is the number of degrees of freedom, i.e., the number of data points minus the number of parameters being fitted. To find the best-fit set of parameters, $\chi_v^2$ is minimized with respect to these parameters.

The minimization may be computed in any number of ways, but the most effective methods are Levenberg-Marquardt (LM), and Variable metric (VM). Both methods need the derivatives of $\chi_v^2$ with respect to each of the model parameters at each point on the image. As the model functions are nonlinear, these derivatives are best computed numerically, using either centered differences:

$$\frac{\partial f}{\partial x} = \frac{f(x+h) - f(x-h)}{2h}$$

or forward differences:

$$\frac{\partial f}{\partial x} = \frac{f(x+h) - f(x)}{h}$$

Here, $h \square 10^{-4}$ is a small number added to each parameter. So, at each point we compute the gradient of $\chi_v^2$:

$$\nabla \chi_v^2 = \left[\frac{\partial \chi_v^2}{\partial A} \frac{\partial \chi_v^2}{\partial B} \frac{\partial \chi_v^2}{\partial x_0} \frac{\partial \chi_v^2}{\partial y_0} \frac{\partial \chi_v^2}{\partial \theta_1} \frac{\partial \chi_v^2}{\partial \theta_2} \frac{\partial \chi_v^2}{\partial \sigma}\right]$$

In the LM method, this gradient forms one row of the Jacobian matrix J. Assume for the moment that there is some initial set of parameters p which will allow J to be computed for the whole image. To improve this initial estimate, the LM method requires the solution of the matrix equation:

$$[J^T J + \lambda I]\Delta p = -J^T r$$

for the correction vector $\Delta p$, i.e., $$p_{new} = p_{old} + \Delta p$$

Here, r is the residual vector, the difference between the observed and computed image brightness at each pixel. Effectively, this residual vector drives the solution process. The LM parameter $\lambda$ is used to govern the convergence of this iterative procedure; if the magnitudes of the residuals are increasing, $\lambda$ is increased, otherwise it decreases as the best-fit solution for p is approached. The LM method is a fast and robust procedure. However, it requires the storage and manipulation of some rather large matrices.

The VM method solves this problem in a convenient way; it constructs directly a matrix similar to:

$$[J^T J + \lambda I]^{-1}$$

known as the inverse Hessian. The Hessian itself rigorously is the matrix of all second derivatives of $\chi_v^2$ with respect to all of the model parameters. In other words, the calculation $$p_{new} = p_{old} + H^{-1}\Delta p$$

is done by constructing $H^{-1}$ directly from $\nabla \chi_\nu^2$. The only minor drawback to this approach is that one must now use a line search to get $\Delta p$ (and hence $H^{-1}$) at each iteration, which means numerous evaluations of $\chi_\nu^2$ (but not its gradient). The VM method takes several iterations to converge, but each iteration is much faster than a single LM iteration.

The VM and LM iterative non-linear least-squares techniques adjust all of the model parameters simultaneously and have been found to:

locate the pointer tip or finger with a precision of approximately 0.1 pixel;

segment reliably the pointer tip or finger from the background; and recognize reliably the type of pointer through the model resolution parameter.

These iterative non-linear least-squares techniques have also been found to yield sharper images when a pointer tip is used to contact the touch system as compared to when a finger is used to contact the touch surface, in terms of the model resolution parameter. This difference in image sharpness is due to the fact that the model describes the pointer as a corner, i.e., two straight lines connected at a common vertex and separated by a given angle. As will be appreciated, this model description fits the shape of a conical pointer tip much better than it does a finger. To compensate for this difference in image sharpness, the iterative non-linear least-squares technique adjusts the model resolution parameter accordingly. In other words, the iterative non-linear least-squares technique smoothes the corner in order to better approximate a finger shape. The end result is that the model resolution parameter tends statistically to be larger for fingers than for pen tools. The following is a typical result for the mean model resolution parameter:

$\langle \sigma \rangle = 1.62 \pm 0.31$ (pen)

$\langle \sigma \rangle = 2.18 \pm 0.24$ (finger)

where the units of measurement are pixels. These results were found by analyzing ten images at random from two video sequences (which typically contain 250 to 500 frames). Similar results were found for four other video sequences. FIGS. 8 and 9 show typical fittings generated by a MATLAB simulation in response to touch surface contacts made using a pen tool and a finger, respectively. Note that a larger value of $\chi_\nu^2$ is more an indication that the model assumptions have been broken in some way (i.e., it is not possible to model every light variation seen in an image).

Although the present technique to differentiate between pointers used to contact a touch system is described as being incorporated in a touch system that uses camera images to generate pointer position data, those of skill in the art will appreciate that the technique may be used in other interactive environments. For example, turning now to FIG. 10, a touch system similar to that disclosed in U.S. Pat. No. 5,448,263 to Martin, assigned to the assignee of the present invention, is shown. As can be seen, touch system 150 includes an analog resistive touch screen 152 having a touch surface 160 on which computer-generated images are projected. A pointer tray 164 is provided along the bottom edge of touch surface 160 and holds pointers in the form of pen tools that are used to contact the touch surface 160. The pointer tray 164, similar to the previous embodiment, simply provides a convenient location to store pen tools. A camera 170 that is aimed generally along the plane of the touch surface 160 is provided adjacent one side of the touch surface and captures images.

Figure 10:
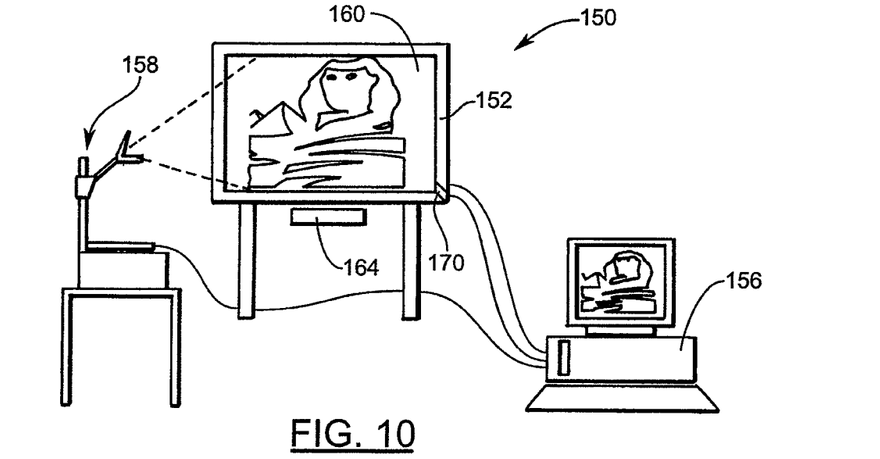
FIG. 10 is a schematic diagram of an alternative embodiment of a touch system in accordance with the present invention.

When a pointer contact is made on the touch surface 160, the touch screen 152 generates pointer position data output representing the location on the touch surface where the pointer contact is made. The pointer position data that is output by the touch screen 152 is conveyed to a computer 156. The computer 156 executes one or more application programs and provides computer-generated image output that is displayed on the touch surface 160 via a projector 158. The touch screen 152, computer 156 and projector 158 form a closed-loop so that pointer contacts with the touch surface 160 can be recorded as writing or drawing or used to control execution of application programs executed by the computer 156. The computer-generated image output by the computer 156 is also updated to reflect the pointer activity.

When the computer 156 receives pointer position data from the touch screen 152, the computer also receives pointer type data from the camera 170. The camera 170 processes captured images in the same manner described above to determine the type of pointer used to contact the touch surface 160 that resulted in the pointer position data being generated. In this manner, the computer can process the pointer position and pointer type data in the appropriate manner. If desired, the captured images can be conveyed to the computer 156 for processing to determine pointer type.

Although touch systems which make use of image data to determine the type of pointer used to contact the touch surface have been described above, automatic pointer differentiation in touch systems employing active pointers can also be achieved. For example, in one such touch system an electromagnetic digitizer is placed behind an analog resistive touch sensitive screen. When a finger is used to contact the touch sensitive screen, only the touch sensitive screen generates pointer position data. However, when an active pointer is used to contact the touch sensitive screen, both the touch sensitive screen and the electromagnetic digitizer generate pointer position data. This difference in pointer position data output is used by the computer to allow contacts made on the touch surface of the touch sensitive screen using an active pen and a finger to be automatically differentiated. The signature of the active pen can be selected to specify its color allowing the computer to determine the color of the active pen used to contact the touch surface.

Alternatively, active radio frequency (RF) pens can be used with an analog resistive touch sensitive screen having a controller capable of recording the RFID tags broadcast by such pens when they are used to contact the touch surface. Since the controller of the touch sensitive screen receives pointer position data and an RFID tag when an RF pen is used to contact the touch surface but only receiving pointer position data when a finger is used to contact the touch surface, the computer is able to differentiate automatically between finger and RF pen contacts on the touch surface. The RFID tag can also be selected to specify the color of the RF pen. Active pens can also be used with a camera-based touch system.

As will be appreciated by those of skill in the art, the present invention is suitable for use in basically any environment where it is desired to distinguish between pointers used to contact a touch surface so that different functions can be invoked automatically without purposefully having to change the mode of operation. Such environments include for example, electronic whiteboards, touch liquid crystal display (LCD) panels, personal digital assistants (PDAs) and portable touch systems.

Although preferred embodiments of the present invention have been described, those of skill in the art will appreciate that variations and modifications may be made without departing from the spirit and scope thereof as defined by the appended claims.

What is claimed is:

1. A method of updating image data used to present an image on a display in response to pointer interaction on the display surface comprising:
   assessing pointer data derived from at least one captured image of the pointer to determine automatically whether the pointer interaction is carried out using a pen tool or a finger; and
   updating the image data based on the type and activity of the pointer, wherein during the assessing the orientation of the sides of said pointer is examined by fitting the pointer data to a mathematical model to determine if said pointer is a pen tool or a finger.

2. The method of claim 1 wherein during updating an editing function is performed when said pointer is pen tool and wherein a mouse event is invoked when said pointer is a finger.

3. The method of claim 1 wherein when said pointer is a pen tool, the pointer shape is further assessed to determine whether the pen tool is a writing tool or an erase tool, when said pen tool is a writing tool, the image data being updated so that said image includes writing corresponding to the writing tool activity on said touch surface and when said pen tool is an erase tool, the image data being updated so that writing in said image corresponding to the erase tool activity on said touch surface is removed.

4. The method of claim 3 wherein opposite ends of the pen tool constitute the writing tool and erase tool, said opposite ends having distinct shapes.

5. A method of updating image data used to present a displayed image on a touch surface in response to pointer interaction with said touch surface, said method comprising:
   displaying an image on said touch surface;
   capturing images looking generally across said touch surface and processing the captured images to generate pointer data when pointer interaction with said touch surface occurs;
   determining the orientation of the sides of said pointer by fitting pointer data to a mathematical model to determine if the pointer interaction occurs using a pen tool or a finger; and
   updating image data used to present the displayed image on said touch surface based on the generated pointer data and the determined type of pointer.

6. The method of claim 5 wherein when said pointer is a pen tool, the pointer shape is examined to determine whether the pen tool is a writing tool or an erase tool, when said pen tool is a writing tool, the image data being updated so that said image includes writing corresponding to the writing tool interaction on said touch surface and when said pen tool is an erase tool, the image data being updated so that writing in said image corresponding to the erase tool interaction on said touch surface is removed.

7. The method of claim 6 wherein opposite ends of the pen tool constitute the writing tool and erase tool, said opposite ends having distinct shapes.

8. The method of claim 5 wherein during updating an editing function is performed when said pointer is pen tool and wherein a mouse event is invoked when said pointer is a finger.

9. A method of updating image data used to present a displayed image on a touch surface in response to pointer contact on said touch surface, said method comprising the steps of:
   displaying an image on said touch surface;
   acquiring images of said touch surface and generating pointer data in response to pointer contact with said touch surface;
   analyzing the acquired images to determine the type of pointer used to contact the touch surface by fitting the pointer data to a mathematical model thereby to determine the orientation of the sides of the pointer; and
   updating image data used to present the displayed image on said touch surface based on the generated pointer data and the determined type of pointer.

10. The method of claim 9 wherein when said pointer is a pen tool, the pointer shape is examined to determine whether the pen tool is a writing tool or an erase tool, when said pen tool is a writing tool, the image data being updated so that said image includes writing corresponding to the writing tool activity on said touch surface and when said pen tool is an erase tool, the image data being updated so that writing in said image corresponding to the erase tool activity on said touch surface is removed.

11. The method of claim 10 wherein opposite ends of the pen tool constitute the writing tool and erase tool, said opposite ends having distinct shapes.

12. The method of claim 10 wherein during updating an editing function is performed when said pointer is pen tool and wherein a mouse event is invoked when said pointer is a finger.

13. A touch system comprising:
   a touch surface on which an image is presented;
   processing structure responsive to pointer contacts on the touch surface; and
   at least one camera to acquire images of said pointer, wherein said processing structure processes said acquired images to determine whether said pointer is a pen tool or a finger based on the orientation of the sides of said pointer by fitting pointer data to a mathematical model and updates the presented image based on the type of pointer and the pointer activity on the touch surface.

14. A touch system according to claim 13 wherein said processing structure edits said presented image when said pointer is a pen tool and invokes a mouse event when said pointer is a finger.

15. A camera-based touch system comprising:
   at least two cameras having overlapping fields of view encompassing an area on which pointer contacts are to be made; and
   processing structure processing image data generated by said cameras to determine the location of a pointer relative to the area when the pointer is captured in images acquired by the cameras and to determine the type of pointer used to contact the area based on the orientation of the sides of the pointer by fitting pointer data to a mathematical model.

16. A camera-based touch system according to claim 15 wherein said processing structure uses the determined location and pointer type to update a processor-generated image.

17. A camera-based touch system according to claim 16 wherein said processor-generated image is presented on said area.

18. A camera-based touch system according to claim 17 wherein said processing structure examines the orientation of the sides of the pointer to determine whether the pointer is a pen tool or a finger.

19. A camera-based touch system according to claim 18 wherein, when said pointer is a pen tool, said processing structure performs a processor-generated image editing function.

20. A camera-based touch system according to claim 18 wherein, when said pointer is a finger, said processing structure invokes a mouse event.

21. A camera-based touch system according to claim 20 wherein, when said pointer is a pen tool, said processing structure performs a processor-generated image editing function.

\* \* \* \* \*